A. W. ROSS.
Cultivator.
No. 59,269.
Patented Oct. 30, 1866.
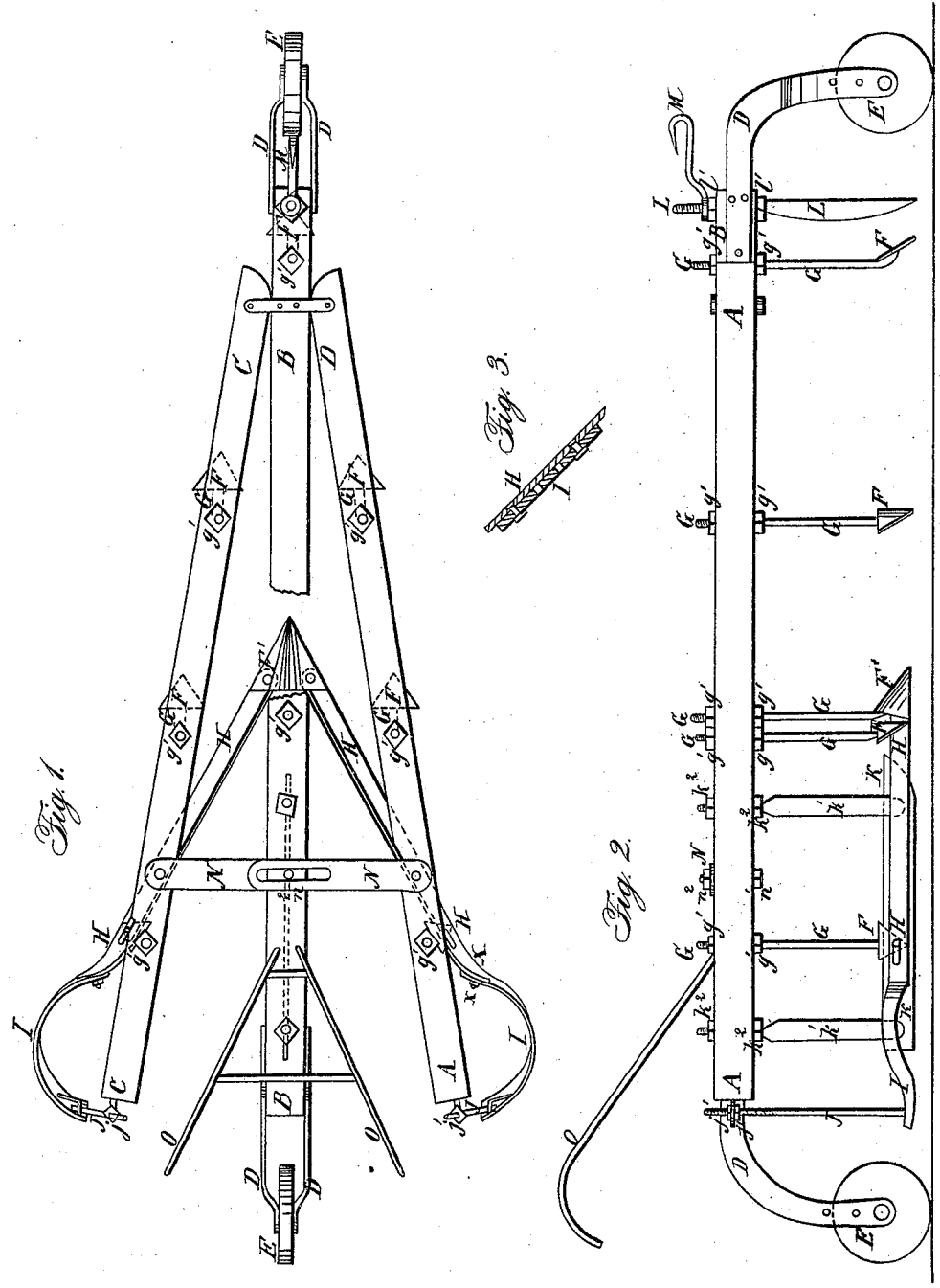
Witnesses:
F. A. Jackson
Theo. Lusch
Inventor:
A. W. Ross
Per Munn
Attorneys

UNITED STATES PATENT OFFICE.

AMOS W. ROSS, OF NORTHFIELD, MASSACHUSETTS.

IMPROVEMENT IN CULTIVATORS.

Specification forming part of Letters Patent No. 59,269, dated October 30, 1866.

*To all whom it may concern:*

Be it known that I, AMOS W. ROSS, of Northfield, in the county of Franklin and State of Masschusetts, have invented a new and useful Improvement in Horse Cultivator and Hoe; and I do hereby declare that the following is a full, clear, and exact description thereof, which will enable others skilled in the art to make and use the same, reference being had to the accompanying drawings, forming a part of this specification, in which—

Figure 1 is a top view of my improved cultivator and hoe, part of the central beam being broken away to show the construction. Fig. 2 is a side view of the same. Fig. 3 is a detail sectional view taken through the line $x\ x$, Fig. 1.

Similar letters of reference indicate like parts.

My invention consists in placing the cultivator upon wheels, which may be adjusted so that the cultivator may be carried with its teeth and hoes raised from the ground, or so lowered that they may enter it to any desired depth; in the cultivator-teeth and adjustable uprights; in the long hoes in combination with the central and rear side teeth of the cultivator; in the combination of the adjustable small curved or hilling hoes with the long hoes; in the combination of the rear governors with the small hoes and with the side beams of the cultivator; in the combination of the main or central governor with the central beam; in the combination of the guard-knife and draft-hook with the central beam and forward tooth of the cultivator; and in the combination of the slotted bars, bolt, and nut with the beams of the cultivator, for the purpose of spreading or contracting the said cultivator, the whole being constructed and arranged as hereinafter more fully described.

A, B, and C are the beams of the cultivator, the central one, B, of which is a little longer than the others, so that its forward end may project, as shown in Fig. 1. To the forward and rear ends of the central beam B are attached the curved arms D, which are adjustably attached to said beam, as shown in Fig. 2, so that they may be raised and lowered as required.

To the downwardly-projecting ends of the arms D are pivoted the axles of the wheels E, several holes being made for the said axles through the said arms D, so that the height of said wheels may be adjusted at will.

F are the cultivator-teeth, which are made of steel, are triangular in form, and have their side edges ground sharp. They are securely attached to the lower ends of the adjustable uprights G. The upper ends of the uprights G pass through the beams A B C, have screw-threads cut upon them, and are adjustably secured to said beams by the nuts $g'$ placed one above and the other below the said beams, as shown in Fig 2, so that the teeth F may be raised and lowered as desired. The central tooth, F', is made larger than the others, and to its sides are pivoted the forward ends of the long hoes H, the rear ends of which are attached to the rear side teeth of the cultivator by bolts passing through slots in the said rear ends, as shown in Fig. 2, so that the said hoes may adjust themselves as the cultivator is spread or contracted.

To the rear ends of the hoes H are attached the forward ends of the curved or hilling hoes I by bolts and nuts passing through holes in the rear ends of the hoes H and in the forward ends of the hoes I, several holes being made in the rear ends of the hoes H, so that the position of the hoes I may be adjusted to form a low or high hill, as the operator may desire.

To the rear ends of the curved hoes I is pivoted the lower end of the governors or adjusting-rods J, the upper ends of which pass up through eyebolts attached to the rear ends of the side beams, A and C, and are adjustably secured in place by the nuts $j$, placed one above and the other below said eyebolts, as shown in Fig. 2.

K is the central governor, the uprights $k^1$ of which pass up through the central beam, B, and are adjustably secured in place by the nuts $k^2$ in the manner before described.

L is a guard-knife or cutter adjustably attached to the forward end of the central beam, B, by the nuts $l'$. This guard-knife is placed directly in front of the forward cultivator-tooth, and is designed to guard that tooth from being broken or strained by opening up the ground in its front. To the upwardly-projecting end of this knife is attached the draft-hook M, as shown in Fig. 2.

N are bars, the outer ends of which are pivoted to the rear parts of the beams A and C. The inner ends of the bars N are slotted and are adjustably secured to the central beam, B, by a bolt, $n^1$, and nut $n^2$, by loosening which the cultivator may be contracted or expanded, as required.

O are the handles by means of which the cultivator is held and guided.

Having thus described my invention, I claim as new and desire to secure by Letters Patent—

1. The combination of the adjustable wheels E and adjustable supporting-arms D with each other and with the front and rear ends of the central beam, B, substantially as herein shown and described.

2. The teeth F and adjustable uprights G, in combination with the cultivator-beams A B C, substantially as herein shown and described.

3. The long hoes H, in combination with the central tooth, F′, and the rear side teeth of the cultivator, substantially as herein shown and described.

4. The combination of the adjustable curved hoes I with the rear ends of the long hoes H, substantially as herein shown and described.

5. The combination of the rear governors or adjusting-rods J with the curved hoes I and the rear ends of the side beams, B C, substantially as herein shown and described.

6. The combination of the central adjustable governor K with the central beam, B, substantially as herein shown and described.

7. The combination of the guard-knife L and draft-hook M with each other, with the forward end of the central beam, B, and with the front central tooth, F, substantially as herein shown and described.

8. The combination of the slotted adjusting-bars N, bolt $n^1$, and nut $n^2$ with each other and with the beams A B C, substantially as herein shown and described.

9. A combined horse cultivator and hoe, constructed and arranged substantially as herein shown and described.

AMOS W. ROSS.

Witnesses:
CHARLES POMEROY,
M. A. POMEROY.